H. ANGEBRANDT, Jr.
DEVICE FOR OILING BALL BEARINGS.
APPLICATION FILED JAN. 13, 1913.
1,099,870.
Patented June 9, 1914.
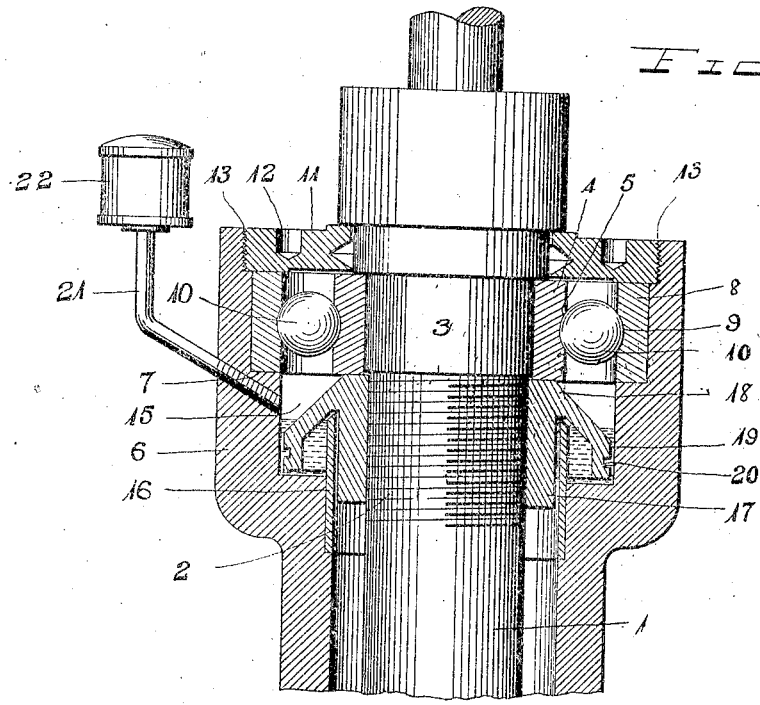
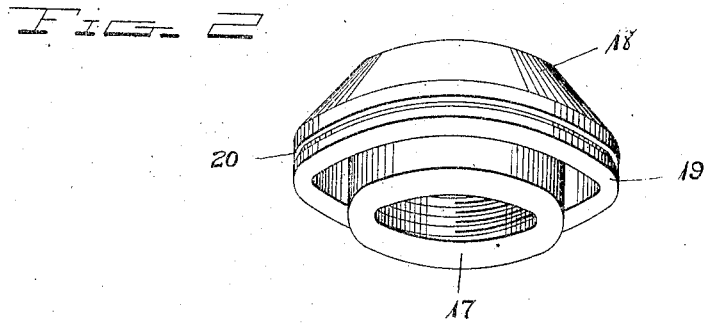
Witnesses
E. D. Haines.
N. L. Collamer
Inventor
H. Angebrandt, Jr.
By H. B. Willson & Co
Attorneys

UNITED STATES PATENT OFFICE.

HUBERT ANGEBRANDT, JR., OF TOLEDO, OHIO.

DEVICE FOR OILING BALL-BEARINGS.

1,099,870.

Specification of Letters Patent.  Patented June 9, 1914.

Application filed January 13, 1913. Serial No. 741,809.

*To all whom it may concern:*

Be it known that I, HUBERT ANGEBRANDT, Jr., a citizen of the United States, residing at Toledo, in the county of Lucas and State of Ohio, have invented certain new and useful Improvements in Devices for Oiling Ball-Bearings; and I do declare the following to be a full, clear, and exact description of the invention, such as will enable others skilled in the art to which it appertains to make and use the same.

This invention relates to journal bearings, and more especially to those which are self-lubricating; and the object of the same is to provide an upright journal bearing (more especially a ball bearing) with means for forcing the lubricant into the bearing proper through centrifugal action which of course increases with the increased speed of rotation. This object is carried out by constructing the lubricator in the manner hereinafter more fully described and claimed, and as shown in the drawings wherein—

Figure 1 is a central vertical section through this bearing complete, and Fig. 2 is a perspective detail of the spreader.

In the illustration herewith, an upright shaft or journal 1 is shown as threaded as at 2 below a shoulder 3 and as having secured around it above said threads a collar 4 provided with an external groove 5 which forms an inner ball race; and the shaft is loosely surrounded by a shell 6 having an internal shoulder 7 above which is disposed a collar 8 provided with a groove 9 which forms an outer ball race, while steel balls 10 travel between these races. The form of ball bearing thus shown and described is merely typical of any appropriate type of bearing by means of which a shaft 1 may be journaled within a shell 6, and the purpose of the present invention is to supply lubricant to the balls between said races. I prefer to close the upper end of the space between the races by means of a closure, herein shown as a ring 11 having spanner holes 12 by means of which it can be turned, and threaded at its outer edge as at 13 to removably engage corresponding threads within the mouth or upper end of the shell 6 as shown. When this closure is in place it holds the outer collar and ball race 8 upon the shoulder 7, but permits the inner collar and ball race 4 to rotate with the shaft 1, upon which it is secured in any suitable manner.

Coming now more particularly to the details of the present invention, the interior of the shell 6 below its shoulder 7 is channeled out to produce an internal chamber 15, which is disposed directly below the space between the two races and communicates with such space at its upper end. The outer and bottom walls of this chamber are formed by the shell 6, and the inner wall is by preference composed of a rather thin band 16 whose upper edge is spaced some distance below the ball bearing above described. Detachably engaged with the threads 2 is the threaded bore of a sleeve 17 which surrounds the shaft 1 beneath its shoulder 3, and forms part of a spreader best seen in Fig. 2; and from the upper end of said sleeve the body of said spreader diverges and declines in all directions as at 18 so that this element has the external appearance of a truncated cone. The lower edge of the body by preference carries a skirt 19 which may have one or more external grooves 20, and this skirt hangs within the annular chamber 15 near the bottom thereof while the inclined body near its juncture with the upper end of the sleeve 17 passes over the upper edge of the band 16 and out of contact therewith. Said chamber 15 may be supplied with lubricant in any suitable manner, and in the drawings I have shown a fine duct 21 led through the wall of the shell and carrying a cup 22 at its upper end. Obviously when the lubricant is poured into said cup it travels down the duct and fills the chamber 15 on both the inside and outside of said skirt 19, but I do not wish to be confined to this precise means for filling the chamber.

The action of this device is as follows: Assuming that the shell is fixed and the shaft 1 rotates, the latter carries the spreader with it and its skirt travels around within the annular chamber 15 and dips into the oil therein. Very soon the oil will partake of the rotary movement of the spreader and will itself travel around within the chamber, and the centrifugal force thereby imparted to it will cause it to ride up the outer wall of the chamber until eventually it is driven upward into the space between the two ball races and directly onto the balls 10 in a manner which will be clear. It is quite obvious that the higher the rate of speed at which the shaft 1 is rotated the greater the centrifugal force set up and therefore the greater the volume of oil applied to the bearing, and it will also be quite obvious that the details of construction of said bearing are not essential to the successful operation of this device. When the shaft or journal 1 again comes to rest, the oil settles down to a level as seen in Fig. 1 of the drawings, and if it has been depleted it may be replaced by more lubricant applied through the cup 22 and duct 21 or in any other suitable manner.

I do not wish to be confined to the strict details of construction hereinbefore described, nor to the materials and proportions of parts.

What is claimed as new is:

In a lubricator, the combination with an upright shaft having three successively smaller downwardly facing shoulders and reduced and threaded below the lowermost, a tubular shell loosely surrounding the shaft and having an internal upwardly facing shoulder, an internal annular channel beneath it, and enlarged and internally threaded at its upper end, an inner ball race around the shaft above its lowermost shoulder, an outer ball race within the shell above its shoulder, and a series of balls between said races; of a spreader consisting of a sleeve engaging the threads of the shaft below the inner race, a body in the shape of a truncated cone carried by the upper edge of said sleeve and projecting outward, and a skirt depending from the larger end of the body into the channel within the shell; an upright band secured within the bore of said shell and constituting the inner wall of said channel, and a closure engaging the threads in the mouth of said shell and closely surrounding the shaft below its uppermost shoulder and, the shoulder next thereto and above said ball bearing.

In testimony whereof I have hereunto set my hand in presence of two subscribing witnesses.

HUBERT ANGEBRANDT, Jr.

Witnesses:
 JNO. P. MONAGHAN,
 P. F. SCHNEIDER.